Patented Apr. 10, 1951

2,548,693

UNITED STATES PATENT OFFICE 2,548,693

PROCESS OF PRODUCING EXPLOSIVES CONTAINING AMMONIUM NITRATE

John Whetstone, West Kilbride, and James Taylor, Saltcoats, Scotland, assignors to Imperial Chemical Industries Limited, a corporation of Great Britain No Drawing. Application July 17, 1946, Serial No. 684,241. In Great Britain August 24, 1945

6 Claims. (Cl. 52—20)

The present invention relates to improvements in the production of explosives containing ammonium nitrate.

Ammonium nitrate is produced in large quantities for use in the manufacture of explosives, but the fact that it is a crystalline solid has hitherto limited its application to a certain extent. For instance the crystalline solid nature of the compound has hitherto limited the amount which can be included in nitroglycerine gelatine explosive compositions.

The present invention embodies the idea of employing as an ingredient of the explosive a chemically stable non-volatile composition liquid at ordinary room temperature and including at most only a small proportion of water, this composition containing the ammonium nitrate in solution. By this means we are enabled to include in gelatine explosives amounts of ammonium nitrate limited by sensitiveness considerations only, without loading it with crystalline salts. The fluid form of the ammonium nitrate composition facilitates the preparation of explosives such as Amatol and other high density explosive compositions, and also those of plastic explosives, in which the liquid can serve as a plasticiser at ordinary temperatures, preferably after a colloid has been dissolved in it to make it into a gel. Oxygen positive plasticisers can thus be made available for use in the manufacture of explosives.

It is known that ammonium nitrate and urea form a binary eutectic having a melting point of 44.7° C. containing 47% urea (Howells, Journ. Chem. Soc. 1929, p. 910) and that a ternary eutectic can be formed containing 45% urea, 47.5% ammonium nitrate and 7.5% sodium nitrate and having a melting point of 37.1° C. (Howells, Journ. Chem. Soc. 1930, p. 2010). It is also known that a ternary eutectic having a melting point of 42.5° C. can be produced from 45.5% urea, 52.0% ammonium nitrate and 2.5% resorcinol (Hrynakowski Z. Krist 94, p. 358 (1938)).

By the inclusion of one or more of the compounds of the kind hereinafter defined in ammonium nitrate and urea mixtures it is possible to provide eutectics and compositions which are liquid round about room temperatures or less. The said one or more compounds which are to be included in the ammonium nitrate-urea compositions are ammonium nitrate fusion point depressing inorganic salts and organic materials which are of low molecular weight and are freely soluble in fused ammonium nitrate and urea: are not highly associated in ammonium nitrate solution (such substances are usually found to be freely water soluble in the cold); do not form insoluble or sparsely soluble salts by double decomposition with ammonium nitrate, or by co-ordination with urea, to an extent that the desired reduction in the fusion point of the ammonium nitrate urea eutectic or composition is not attained.

The following are examples of suitable compounds which can be added preferably two or more than two at a time to ammonium nitrate and urea mixtures, namely, hydrated salts such as ordinary "hypo" and sodium acetate and non-hydrated compounds such as ammonium sulphamate, ammonium thiosulphate, ammonium formate, ammonium acetate, ammonium thiocyanate, ammonium hypophosphite, acetamide, propionamide, anhydrous sodium acetate, methylamine nitrate.

The following inorganic salts are described by Boilstein as giving addition compounds with urea and are thus unsuitable as additions at least in any quantity: sodium chloride, ammonium chloride, zinc chloride, cadmium chloride, mercuric chloride, calcium bromide, calcium iodide, sodium nitrate, silver nitrate, calcium nitrate, magnesium nitrate.

The following substances which are freely water soluble and of low molecular weight have been found to raise the crystallising temperature of the ammonium nitrate-urea eutectic: sodium perchlorate, ammonium fluoride, urea nitrate, potassium dihydrogen phosphate. These substances are thus unsuitable as additions.

It is also possible however to prepare for use according to the present invention liquid ammonium nitrate compositions in the absence of urea as for example from admixtures of ammonium nitrate and calcium nitrate tetrahydrate. Urea and ammonium thiocyanate in the ratio 50 parts to 40 parts also give a eutectic which may be rendered liquid at ordinary temperatures by adding 10 parts of ammonium nitrate. All the aforesaid liquid chemically stable ammonium nitrate compositions possess the property of forming gels when heated with starch or certain other hydrophilic colloids.

According to the present invention the method for the production of ammonium nitrate explosives comprises admixing at least a part of the ammonium nitrate in the form of a chemically stable non-volatile liquid or gel, containing its ammonium nitrate in solution at ordinary room temperatures and if desired containing also a colloid in solution with any one or more of the other components of the ammonium nitrate explosive composition. The said component may be for example an explosive sensitising ingredient. The temperature at which the liquid or gel may be mixed may advantageously be an ordinary room temperature.

Preferably the said stable non-volatile ammonium nitrate liquid composition is used in the form of a jelly containing a colloid dissolved in it. Control of the consistency of the jelly, particularly for use in gelatines, is desirable for control of sensitivity.

The following examples illustrate how the invention can be effected, wherein parts are parts by weight:

*Example 1*

An emulsion of nitroglycerine in a gelled liquid ammonium nitrate composition is prepared as follows.

A liquid ammonium nitrate of the following composition:

|  | Parts |
|---|---|
| Ammonium nitrate | 50 |
| Urea | 25 |
| Sodium acetate trihydrate | 15 |
| Sodium thiosulphate pentahydrate | 10 | is first prepared by trituration and warming of the above four ingredients when liquefaction is brought about. The warmed mixture on cooling deposits a small quantity of crystalline material, probably sodium nitrate, but on filtration the filtrate remains liquid at room temperature and does not completely solidify at −10° C. The oxygen value per gram is −0.18 and the water content 9.6%. The mixture is then gelled by adding 3% starch and heating to 90° C. until the liquid thickens, in a few minutes.

20% of nitroglycerine containing 1% blasting soluble nitrocotton is introduced as the disperse phase into 80% of the gel as the continuous phase to give a soft gel-like explosive which detonates satisfactorily with a No. 6 commercial detonator.

*Example 2*

An emulsion of a liquid ammonium nitrate composition in nitroglycerine is prepared as follows:

Nitroglycerine is thickened to a viscosity of about 1500 centistokes at 55° C. by the addition of 7.5% extra low viscosity nitrocotton. Diethyl diphenyl urea is added to the extent of 1% as a stabiliser.

A liquid ammonium nitrate composition is prepared by mixing together 66% calcium nitrate tetrahydrate and 34 per cent ammonium nitrate is stirred by hand into the nitroglycerine base at 55–60° C., to produce a homogeneous emulsion. Such an emulsion containing 7% of the said liquid ammonium nitrate composition is initiated satisfactorily by a No. 6 commercial detonator.

*Example 3*

A blasting gelatine composition containing 10% of the gelled liquid ammonium nitrate composition used in Example 1 as the disperse phase detonates satisfactorily with a No. 6 commercial detonator.

*Example 4*

By the introduction of the ammonium nitrate liquid gels into an ammonium nitrate gelignite it is possible to reduce the quantity of nitroglycerine and still obtain a plastic extrudable explosive composition. In the following table B refers to the starch-gelled liquid ammonium nitrate composition used in Example 1, and A refers to a similar composition except for the omission of the starch-gelled liquid ammonium nitrate composition and an increase in the percentages of nitroglycerine and nitrocotton.

|  | A | B |
|---|---|---|
|  | *Per cent* | *Per cent* |
| Nitroglycerine | 34.0 | 30.6 |
| Liquid nitrobody | 1.8 | 1.8 |
| Nitrocotton | 1.0 | 0.9 |
| Ammonium nitrate | 36.3 | 36.3 |
| Sodium nitrate | 19.0 | 19.0 |
| Woodmeal | 3.6 | 3.6 |
| Oat husk meal | 4.0 | 4.0 |
| Chalk | 0.3 | 0.3 |
| (Alcohol (extra)) | 0.3 | 0.3 |
| Starch gel in liquid ammonium nitrate composition |  | 3.5 |
| Ardeer Double Cartridge Sensitiveness Test ___inches | 4–5 | 1–2 |
| Power by the Ballistic Mortar Method (Blasting Gelatine=100) | 71.7 | 71.3 |

According to the Ardeer Double Cartridge Gap Sensitiveness test one cartridge is separated by a progressively varied distance from another cartridge of the same explosive distally primed with a detonator and in line with it. The maximum gap distance across which detonation can be effected is taken as a measure of the sensitiveness of gelatine blasting explosives to detonation.

*Example 5*

A blasting explosive based on pentaerythritol tetranitrate can be produced as follows:

Five parts of starch are mixed with 31 parts of the liquid ammonium nitrate composition used in Example 1 and heated to 90° C. for half an hour to gel the starch. 64 parts of fine pentaerythritol tetranitrate are then added to the starch gel and the composition is mixed in a McRoberts mixer at 35° C. for half an hour. The plastic composition so produced is of good consistency and is sensitive to initiation by a No. 6 detonator.

*Example 6*

A blasting explosive based on pentaerythritol tetranitrate can also be produced as follows:

A liquid ammonium nitrate composition is prepared from 33 parts ammonium nitrate and 67 parts of calcium nitrate tetrahydrate. 30 parts of this mix are gelled with 5 parts of starch by heating the admixture to 90° C. for half an hour. The resulting gel is mixed with 65 parts of fine pentaerythritol tetranitrate. The plastic is of satisfactory consistency and can be detonated with a No. 8 detonator.

*Example 7*

A plastic explosive based on cyclotrimethylene trinitramine can also be prepared as follows:

26.5 parts of the ammonium nitrate gel prepared according to Example 5 is mixed with 73.5 parts of fine cyclotrimethylene trinitramine. A good plastic of high power and sensative to a No. 6 detonator is produced.

*Example 8*

A plastic explosive based on cyclotrimethylene trinitramine can also be prepared as follows:

27 parts of the ammonium nitrate gel prepared according to Example 6 is mixed with 73 parts of fine cyclomethylene trinitramine. A good plastic of high power and sensitive to a No. 6 detonator is produced.

We claim:

1. A method for the production of explosives containing ammonium nitrate which comprises incorporating at least a part of the ammonium nitrate component into the explosive by the steps of forming a chemically stable composition which is liquid at ordinary room temperature and which comprises ammonium nitrate, urea, and at least one non-volatile compound selected from the compatible members of a freezing point depressant group consisting of ammonium sulphamate, ammonium thiosulphate, ammonium formate, ammonium acetate, ammonium thiocyanate, ammonium hypophosphite, acetamide, propionamide, and methylamine nitrate, said chemically stable composition including at most only a small proportion of water, adding a hydrophylic colloid agent to said chemically stable composition, and thereafter adding said gelled composition to said explosive.

2. A method as set forth in claim 1 wherein said explosive is cyclotrimethylene trinitramine.

3. A method for the production of explosives comprising nitric acid esters containing ammonium nitrate which comprises incorporating at least a part of the ammonium nitrate component into the explosive by the steps of forming a chemically stable composition which is liquid at ordinary room temperature and which comprises ammonium nitrate, urea, and at least one non-volatile compound selected from the compatible members of a freezing point depressant group consisting of ammonium sulphamate, ammonium thiosulphate, ammonium formate, ammonium acetate, ammonium thiocyanate, ammonium hypophosphite, acetamide, propionamide, and methylamine nitrate, said chemically stable composition including at most only a small proportion of water, adding a hydrophylic colloid agent to said chemically stable composition, and thereafter adding said gelled composition to said explosive.

4. A method as set forth in claim 3 wherein said nitric acid ester explosive comprises nitroglycerine and nitrocellulose.

5. A method as set forth in claim 3 wherein said nitric acid ester explosive comprises pentaerythritol tetranitrate.

6. A method as set forth in claim 1 wherein the chemically stable liquid consists of ammonium nitrate and calcium nitrate tetrahydrate in the ratio of 1 to 2.

JOHN WHETSTONE.
JAMES TAYLOR.

REFERENCES CITED

The following references are of record in the file of this patent:

UNITED STATES PATENTS

| Number | Name | Date |
|---|---|---|
| 1,819,457 | Dehn | Aug. 18, 1931 |
| 1,840,431 | Boyd | Jan. 12, 1932 |
| 1,968,158 | Naoum | July 31, 1934 |
| 2,257,360 | Wyler | Sept. 30, 1941 |
| 2,353,147 | Cook | July 11, 1944 |
| 2,455,205 | Whetstone et al. | Nov. 30, 1948 |

FOREIGN PATENTS

| Number | Country | Date |
|---|---|---|
| 307,040 | Germany | Oct. 27, 1919 |
| 326,184 | Germany | Sept. 23, 1920 |
| 380,885 | Germany | Sept. 10, 1923 |
| 380,886 | Germany | Sept. 10, 1923 |